United States Patent [19]

Rooklyn

[11] 4,093,167
[45] June 6, 1978

[54] CONSTRUCTION OF METAL ARTICLES

[76] Inventor: Jack Rooklyn, 19339 Citronia, Northridge, Calif. 91324

[21] Appl. No.: 717,598

[22] Filed: Aug. 26, 1976

[51] Int. Cl.$^2$ ............................................. F16B 12/46
[52] U.S. Cl. ................................... 248/188; 403/172; 403/231; 108/153
[58] Field of Search ............... 403/231, 217, 172, 176, 403/219, 171; 248/188, 188.8; 52/758 H; 108/153, 156, 155

[56] References Cited

U.S. PATENT DOCUMENTS

| | | | |
|---|---|---|---|
| 1,240,390 | 9/1917 | Uhl | 108/155 |
| 1,776,534 | 9/1930 | Allen | 248/188 X |
| 2,346,448 | 4/1944 | Noblitt et al. | 108/153 |
| 3,341,160 | 9/1967 | Jones | 248/188.8 X |
| 3,749,343 | 7/1973 | Marschak | 248/188 |
| 3,754,728 | 8/1973 | Bowman | 108/156 |

Primary Examiner—Andrew V. Kundrat

[57] ABSTRACT

The invention relates to the construction of metal articles such as work benches, pallet racks, etc., by way of example.

In a typical construction upright metal legs are secured to a flat table or platform surface. The upright members or legs preferably may be square in cross section. The upper ends of the legs are secured to mutually perpendicular transverse members which in turn are secured to the flat platform surface, the members being joined by self tapping screws. The transverse members are flat with side flanges which terminate short of the ends the end portions of the flanges being bent inwardly to provide mutually perpendicular securement tabs. The ends of each of two transverse members have securement to 2 flat sides of the end part of the square legs.

5 Claims, 4 Drawing Figures

U.S. Patent  June 6, 1978  4,093,167
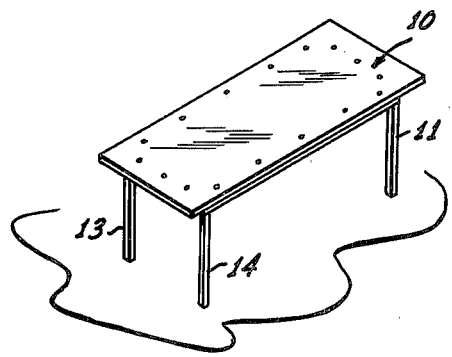
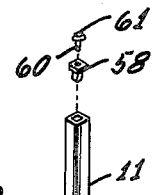
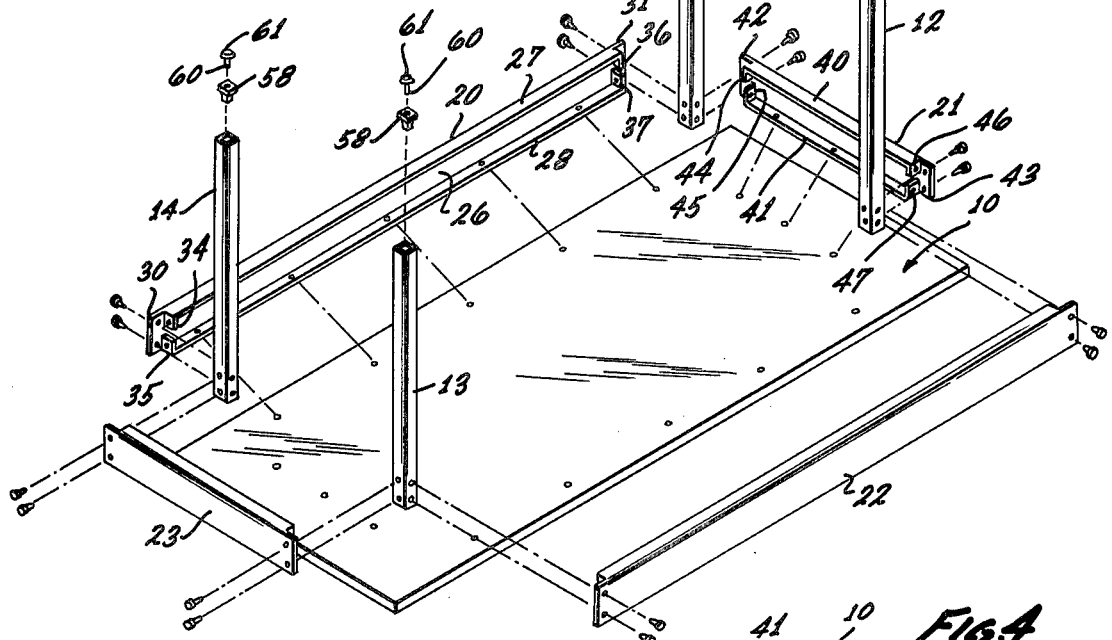
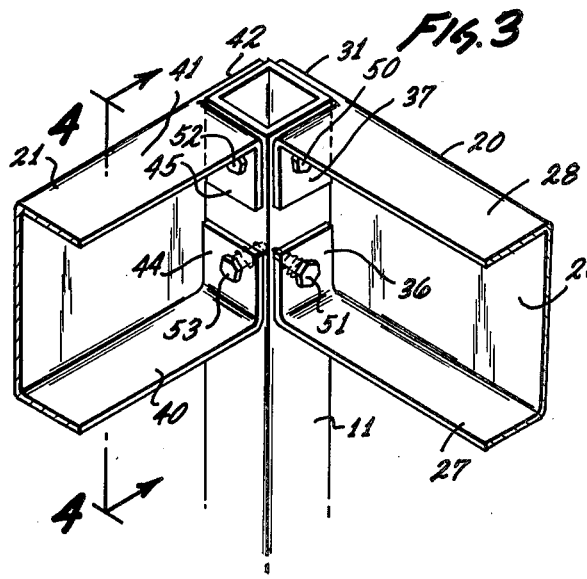
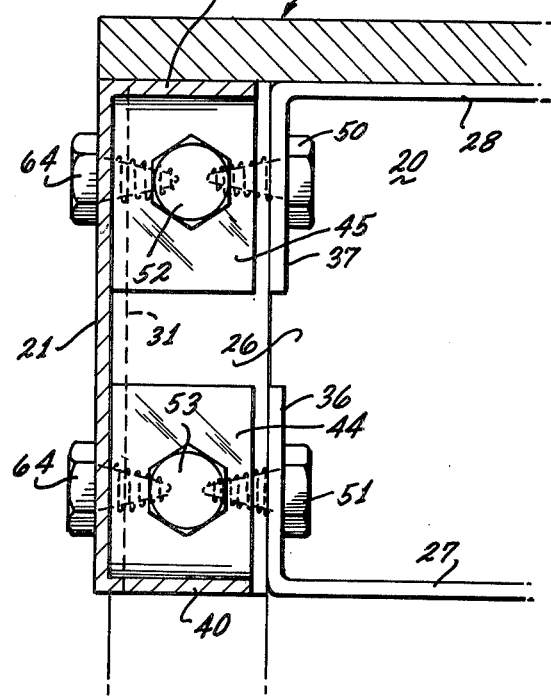

CONSTRUCTION OF METAL ARTICLES

BACKGROUND OF THE INVENTION

1. Field of the Invention

The field of the invention is that of construction of metal articles such as, for example, work benches, pallet racks, etc. The invention relates to the fabrication of the parts and to the joining of the parts to realize the finished structure.

2. Description of the Prior Art Work

Metal articles such as for example work benches, pallet racks, etc., have been constructed in the past, but such prior art construction typically featuring weldments between upright members, that is, legs and lateral members, or otherwise joints between these members were secured by bolts. The prior art construction left considerable room for improvement in the fabrication of individual component members; and more particularly, in the simplification of making the joints between members. The herein invention provides the needed improvements, all as described in detail hereinafter.

SUMMARY OF THE INVENTION

The invention is described in detail hereinafter with respect to an exemplary form which is a workbench. This particular article includes a flat platform or bench surface having legs which are secured to corners of the bench surface. The metal parts are preferably formed or fabricated by forming or stamping.

In the exemplary form of the invention, the metal legs are square in cross section. They are secured or joined at corners of the rectangular metal bench surface. Transverse members are provided which are metal members fabricated by stamping or forming. These members are flat members having side flanges. The side flanges terminate short of the ends of the members, the ends of flanges being bent inwardly to form right angle tabs adapted for securement to end parts of the uprights or legs. The side or transverse members have their ends secured to the square ends of the legs. That is, each end of a transverse member has flat right angle surfaces configured to be juxtaposed against two flat sides of an end of a leg. An adjacent transverse member has right angle surfaces configured to be juxtaposed against the other two flat sides of the end of a leg. The transverse members are secured to the legs by self tapping screws and the transverse members are in turn secured by self tapping screws to edge portions of the flat bench surface. The result is a metal article that is easy to fabricate, but is inexpensive and is extremely strong.

The primary object of the invention is to provide a technique making possible simplified fabrication of metal articles and to realize such articles having increased strength.

A further object is to realize the foregoing technique by way of utilization of formed upright members or legs of square cross-sectional configuration associated with transverse members constructed to have end surfaces joined to ends of the legs by way of self tapping screws.

A further object is to realize the construction as referred to in the foregoing by way of securement of legs to flanged transverse members which are in turn secured to edge portions of a flat bench member.

Further objects and additional advantages of the invention will become apparent from the following detailed description and annexed drawings:

BRIEF DESCRIPTION OF THE DRAWINGS

FIG. 1 is a pictorial isometric view of the exemplary form of article constructed in accordance with the invention;

FIG. 2 is an isometric exploded view of the article of FIG. 1;

FIG. 3 is a detailed view of the joint at a corner of the article;

FIG. 4 is a sectional view taken along the line 4—4 of FIG. 3.

DESCRIPTION OF THE PREFERRED EMBODIMENT

Referring now more particularly to the various figures of the drawings, FIG.1 shows the exemplary article which has a flat metal bench surface 10 which is rectangular in shape. The article has uprights or legs shown more particularly in FIG. 2 and designated at 11, 12, 13, and 14. The legs 11 – 14 are joined to side or transverse members as designated at 20, 21, 22, and 23.

The legs 11 – 14 may be fabricated by stamping or forming from metal and are square in cross section as shown.

The side or transverse members 20 – 23 include the two side members, 20 and 22 and the end members 21 and 23. These members are similarly constructed being fabricated from metal by stamping or forming. Referring to the member 22, it is constructed to provide a flat surface portion, the inside of which is designated at 26. It has side flanges 27 and 28. These side flanges terminate short of the end of the member leaving end portions as designated at 30 and 31. The end parts of the side flanges 27 and 28 are bent inwardly at right angles forming tabs designated at 34 and 35 at one end; and 36 and 37 at the other end.

The spacing between tabs 34 and 35 and the end 30 is such as to accomodate or to have juxtaposed there against an end part of the leg 14.

The end member 21 has side flanges 40 and 41. The side flanges terminate short of the ends 42 and 43. The ends of the side flanges are turned inwardly providing tabs 44 and 45 at one end and providing tabs 46 and 47 at the opposite end spaced inwardly from the end 43.

FIG. 3 shows the construction of the joint at one corner between side members 20 and 21 and the leg 11. As may be seen the end 31 of the transverse member 20 and its tabs 36 and 37 and the end part 42 of the side member 21 and its tabs 44 and 45 form a square into which the end of the square leg 11 fits.

As may be seen, the end 31 and the side member 20 and its tabs 36 and 37 are juxtaposed against two flat sides of the square leg 11. The end 42 of the side member 21 and its tabs 41, 45 fit against two other flat sides of the square leg 11 as shown. Juxtaposed surfaces are joined by self tapping screws as illustrated at 50, 51, 52, and 53.

FIG. 4 illustrates the underside of the article illustrating two of the corner joints.

Preferably the bottom ends of the legs are closed by caps as shown at 58 which are then threaded to receive end buttons as shown at 60 which are made of metal with plastic inserts 61.

An important consideration is that the parts can be secured by self-tapping screws as shown by way of example at 64 in FIG. 4. The nature of the way of fabricating makes this possible. The flat table or platform surface 10 is secured to members 20 and 22 in this manner as illustrated in FIGS. 1 and 2.

From the foregoing, those skilled in the art will readily understand the nature and construction of the invention and the manner in which all of the objects as set forth in the foregoing are realized. All of the parts are fabricated using simplified procedures. The assembly of the finished article is simplified. Nevertheless an extremely strong, sturdy, and effective article is realized.

The foregoing disclosure is representative of a preferred form of the invention and is to be interpreted in an illustrative rather than a limiting sense, the invention to be accorded the full scope of the claims appended hereto.

I claim:

1. In the construction of metal articles having polygonal upright members and channel shaped transverse members, in combination, an upright member having an end part having flat side portions lying in mutually perpendicular transverse planes, channel shaped transverse members constructed to be secured to the end portion of the said upright member by way of joints, each channel shaped transverse member having side flanges and end parts including portions having surfaces lying in mutually perpendicular transverse planes, configurated to fit against surfaces of the sides of the end part adjacent to but not beyond the end of the upright member, certain of said portions comprising opposed tabs formed by inwardly bent parts of the terminal ends of said side flanges, said tabs nesting on the outside of said upright member and securing means securing the said juxtaposed surfaces to each other, and the bottom of said channel shaped member devoid of its side flanges by the formation of said tabs resting on one of said surfaces of the sides of the end part but not extending beyond the side edge thereof.

2. A construction as in claim 1 wherein the said end part of the upright member is constructed to provide two additional flat side portions lying in mutually perpendicular transverse planes, a second similar transverse member having corresponding surfaces lying in mutually perpendicular planes and constructed to fit against and to be secured to said additional flat portions at the end of said upright member.

3. A construction as in claim 2 wherein the end part of said upright member is square in cross section, and means including a flat platform secured to said transverse members.

4. A construction as in claim 1, the end part of the upright member providing a square cross section and the ends of the transverse members being secured to the end of the upright member in mutually perpendicular relationship.

5. A construction as in claim 1 wherein the ends of the similar transverse members are secured to the end part of the upright member by way of self tapping screws.

* * * * *